US009658861B2

(12) United States Patent
Chang et al.

(10) Patent No.: US 9,658,861 B2
(45) Date of Patent: May 23, 2017

(54) BOOT STRAP PROCESSOR ASSIGNMENT FOR A MULTI-CORE PROCESSING UNIT

(75) Inventors: Steven S. Chang, San Jose, CA (US); Anshuman Thakur, Beaverton, OR (US); Ramacharan Sundararaman, Hillsboro, OR (US); Ramon Matas, Hillsboro, OR (US); Jay S. Lawlor, Hillsboro, OR (US); Robert F. Netting, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 583 days.

(21) Appl. No.: 13/993,310

(22) PCT Filed: Dec. 29, 2011

(86) PCT No.: PCT/US2011/067885
§ 371 (c)(1),
(2), (4) Date: Jun. 11, 2013

(87) PCT Pub. No.: WO2013/101086
PCT Pub. Date: Jul. 4, 2013

(65) Prior Publication Data
US 2014/0006767 A1    Jan. 2, 2014

(51) Int. Cl.
*G06F 9/44*    (2006.01)
*G06F 15/177*    (2006.01)

(52) U.S. Cl.
CPC .......... *G06F 9/4405* (2013.01); *G06F 15/177* (2013.01)

(58) Field of Classification Search
CPC .................................................... G06F 9/4405
See application file for complete search history.

(56) References Cited

U.S. PATENT DOCUMENTS 5,904,733 A * 5/1999 Jayakumar ............ G06F 15/177
713/1
6,584,560 B1 * 6/2003 Kroun ................... G06F 15/177
713/1
(Continued)

FOREIGN PATENT DOCUMENTS

TW    200923671 A    6/2009

OTHER PUBLICATIONS

PCT International Search Report for PCT Counterpart Application No. PCT/US2011/67885, 8 pgs., (Sep. 5, 2012).
(Continued)

*Primary Examiner* — Paul Yanchus, III
*Assistant Examiner* — Joshua Neveln
(74) *Attorney, Agent, or Firm* — Nicholson De Vos Webster & Elliott LLP

(57) ABSTRACT

Following a restart or a reboot of a system that includes a multi-core processor, the multi-core processor may assign one of the cores as a boot strap processor (BSP). Initialization logic may detect a state of each of the plurality of processing cores as active or inactive. The initialization logic may detect an attribute of each of the plurality of processing cores as eligible to be assigned as a BSP or as ineligible to be assigned as the BSP. The initialization logic may detect a last processing core of the plurality of processing cores in the interconnect that is an active processing core based at least in part on the state and is eligible to be assigned as the BSP based at least in part on the attribute. In various embodiments, the initialization information may assign the last processing core as the BSP.

15 Claims, 8 Drawing Sheets

(56) References Cited

U.S. PATENT DOCUMENTS

| | | | |
|---|---|---|---|
| 6,687,818 B1 | 2/2004 | Svenkeson et al. | |
| 6,760,838 B2* | 7/2004 | Owen | G06F 15/177 709/250 |
| 2002/0103995 A1 | 8/2002 | Owen et al. | |
| 2003/0233492 A1* | 12/2003 | Schelling | G06F 9/4405 713/375 |
| 2004/0133751 A1 | 7/2004 | Collins et al. | |

OTHER PUBLICATIONS

PCT Written Opinion of the International Searching Authority for PCT Counterpart Application No. PCT/US2011/67885, 5 pgs., (Sep. 5, 2012).

PCT Notification concerning Transmittal of International Preliminary Report on Patentability (Chapter I of the Patent Cooperation Treaty) for PCT Counterpart Application No. PCT/US2011/67885, 7 pgs., (Jul. 10, 2014).

Office action and Search Report with summarized English translation from Taiwan Patent Application No. 101149807, dated Nov. 7, 2014, 13 pages.

* cited by examiner

BOOT STRAP PROCESSOR ASSIGNMENT FOR A MULTI-CORE PROCESSING UNIT

CROSS-REFERENCE TO RELATED APPLICATION

This patent application is a U.S. National Phase Application under 35 U.S.C. §371 of International Application No. PCT/US2011/067885, filed Dec. 29, 2011, entitled BOOT STRAP PROCESSOR ASSIGNMENT FOR A MULTI-CORE PROCESSING UNIT.

TECHNICAL FIELD

This disclosure relates generally to the field of microprocessors. In particular, this disclosure relates to assignment of a boot strap processor to a processing core of a multi-core processing unit.

BACKGROUND ART

Until recently, computing devices typically included a single processing unit for each socket available on the computing device's main circuit board. More recently, the single processing unit has been improved to include multiple cores, which enable the processor to execute instructions in parallel using the various cores. An ability to include additional processors or cores on a chip becomes more readily available as the footprint of the cores continues to decrease through advancements in manufacturing.

The inclusion of many cores on a chip, termed "system on a chip" or "SOC", where the SOC is accessible to the computing device through a socket, may present some new challenges to both hardware and software architects. One challenge is that the additional cores should be accessible by the socket with minimized communication paths that link the cores, thereby saving valuable space on the chip for additional cores or other necessary components. These challenges are further complicated when the availability of the cores may change during an operational life of the SOC.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed to assignment of a boot strap processor (BSP) to a processing core in a multi-core processor. The multi-core processor may include many cores, which may be central processing units (CPUs), graphical processing units (GPUs), general processing graphical processing units (GPGPUs), other processing logic, or a combination thereof. The various cores may be in communication with each other and/or an initialization core via an interconnect. The interconnect may be arranged as a mesh interconnect, a shared interconnect, a peer-to-peer (P2P) interconnect, or a ring interconnect.

Following a restart or a reboot of a system that includes the multi-core processor, the multi-core processor may assign one of the cores as the BSP. In accordance with at least some embodiments, initialization logic may detect a state of each of the plurality of processing cores as active or inactive. Cores that are inactive may be deactivated for various reasons such as due to a malfunction of the core or for other reasons. The initialization logic may detect an attribute of each of the plurality of processing cores as eligible to be assigned as a BSP or as ineligible to be assigned as the BSP. The initialization logic may detect a last processing core of the plurality of processing cores in the interconnect that is an active processing core based at least in part on the state and is eligible to be assigned as the BSP based at least in part on the attribute. In various embodiments, the initialization information may assign the last processing core as the BSP. Thus, in a situation where the multi-core processor initiates a booting up process, the BSP may be used to perform some or all of the functions of the booting up process. Thus, the BSP may load an operating system.

The techniques, apparatuses, and systems described herein may be implemented in a number of ways. Example implementations are provided below with reference to the following figures.

Illustrative Environment

Figure 1:
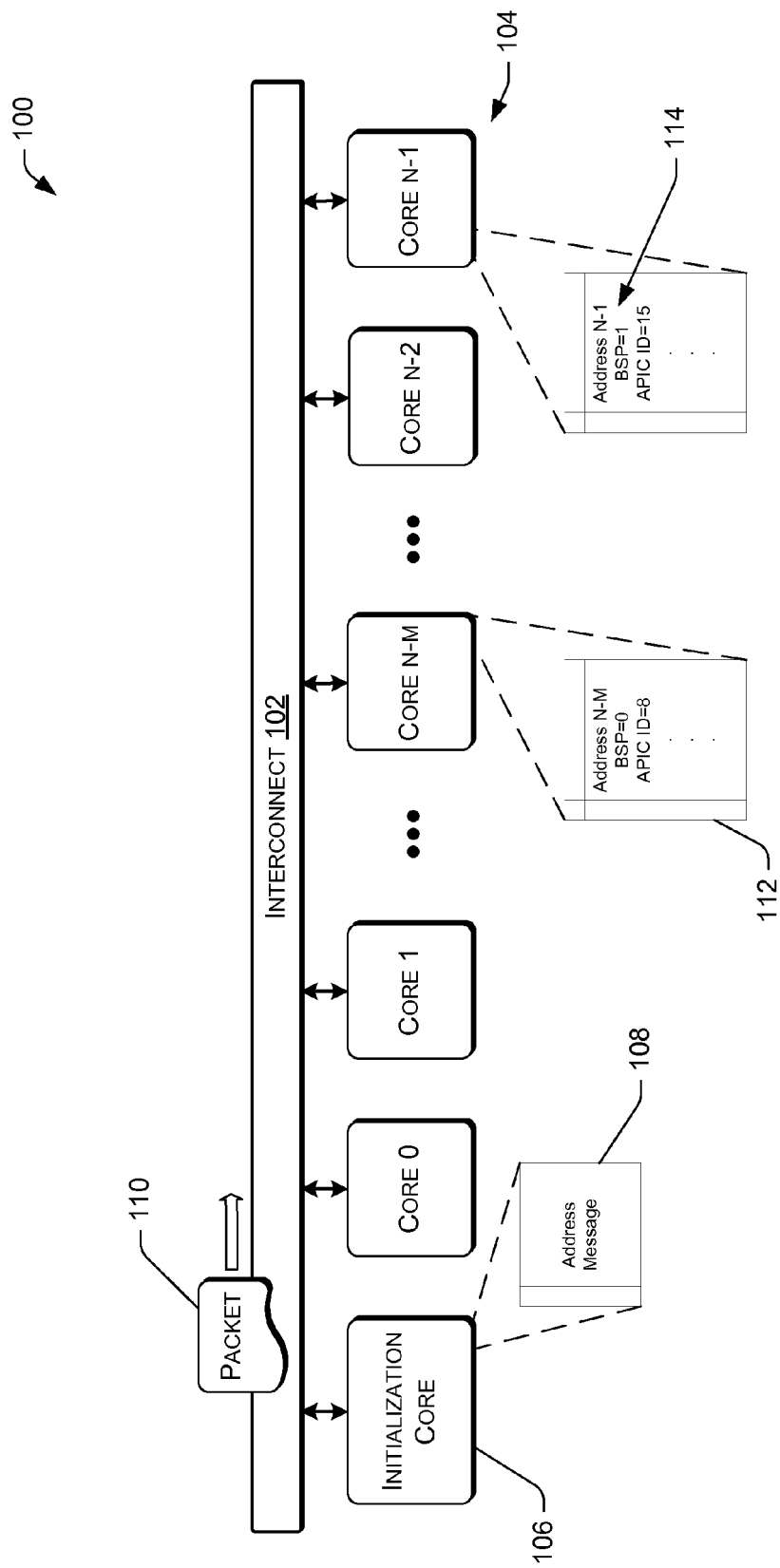
FIG. 1 is a schematic diagram of an illustrative multi-core processing unit that uses an interconnect to facilitate communication between the cores.

FIG. 1 is a schematic diagram of an illustrative multi-core processing unit 100 that uses an interconnect 102 to facilitate communication between the cores. In various embodiments, the multi-core processing unit 100 (or processor) may include a plurality of cores 104, which may be central processing units (CPUs), graphical processing units (GPUs), general processing graphical processing units (GPGPUs), other processing logic, or a combination thereof.

Figure 2:
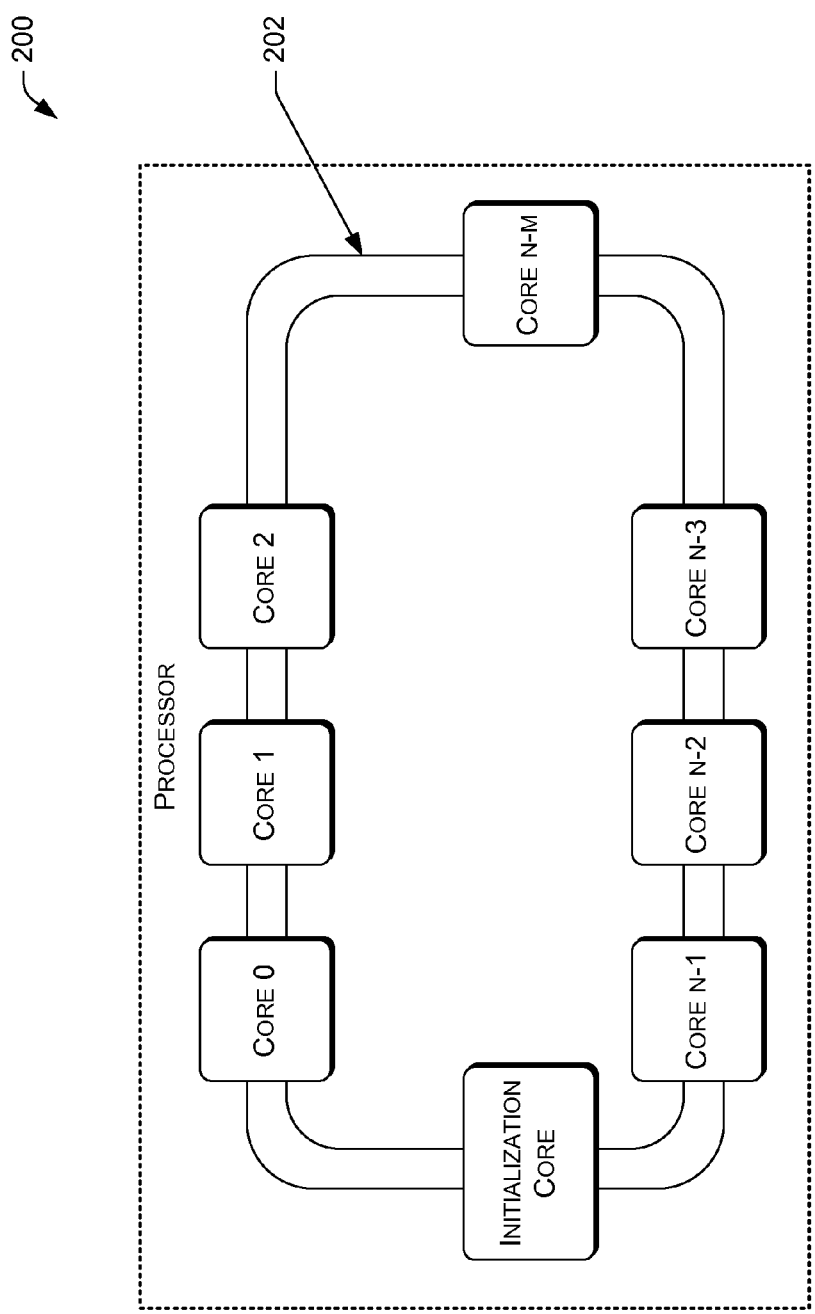
FIG. 2 is a schematic diagram of an illustrative multi-core processing unit that uses an interconnect arranged as a ring structure.
Figure 3:
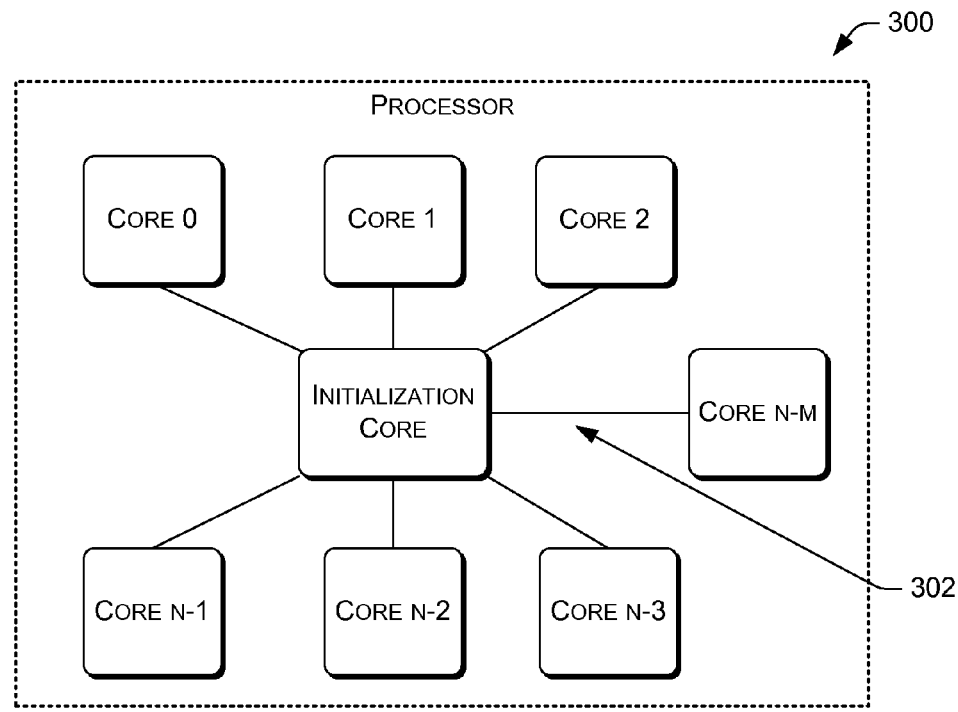
FIG. 3 is a schematic diagram of an illustrative multi-core processing unit that uses an interconnect arranged as a mesh.
Figure 4:
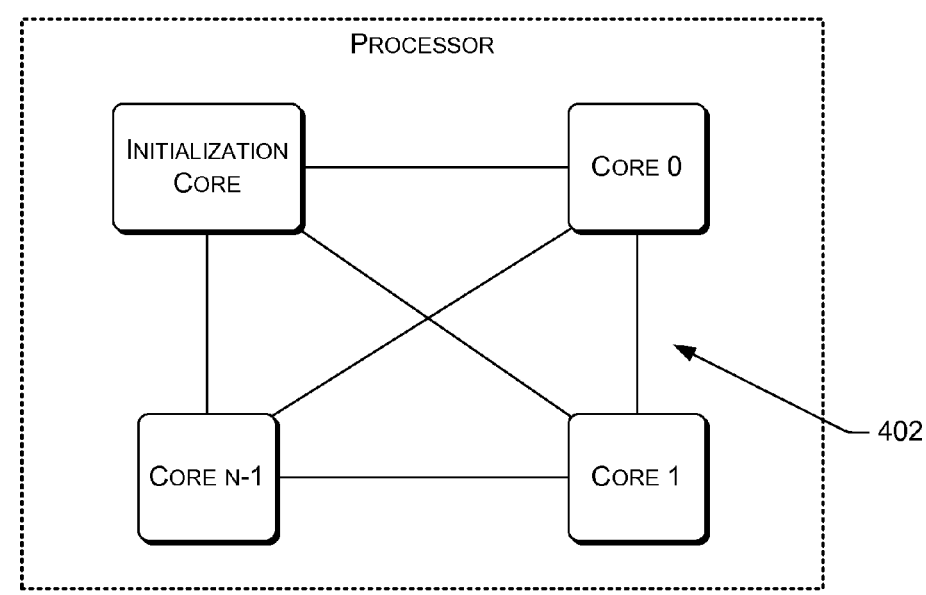
FIG. 4 is a schematic diagram of an illustrative multi-core processing unit that uses an interconnect arranged in a peer-to-peer configuration.

In accordance with the some embodiments, the various cores may be in communication with each other and/or an initialization core 106 via the interconnect 102. In accordance with various embodiments, the interconnect 102 may be arranged as a shared interconnect as shown in FIG. 1, as a ring interconnect as shown in FIG. 2, as a mesh interconnect as shown in FIG. 3, or as a peer-to-peer (P2P) interconnect as shown in FIG. 4.

The initialization core 106 may be a processor core that includes initialization logic 108. The initialization logic 108 may be used to transmit information to one or more of the plurality of cores through use of a packet 110. The initialization logic may be implemented following a reboot or a reset of the processing unit 100. For example, when the processing unit 100 is reset or rebooted, then the initialization logic may perform a number of operations before the plurality of cores may begin to process external software, such as software run by applications through an operating system.

In accordance with at least some embodiments, the initialization logic 108 may detect a state of each of the plurality of processing cores as active or inactive. Cores that are inactive may be deactivated for various reasons such as due to a malfunction of the core or for other reasons. For example, after deployment of the processing unit 100, one or more of the plurality of cores 104 may fail or otherwise need to be deactivated. After a core is deactivated, any essential operations performed by the deactivated core may need to be assigned to another core. Thus, the initialization logic 108 may reassign some operations performed by a core that was active, but has been deactivated, to other cores that are still active. One of these operations is a boot operation. A processing core that performs the boot operation is referred to herein as a boot strap processor (BSP). Thus, following a reset or a reboot operation, the initialization logic 108 may assign one of the plurality of cores to act as the boot strap processor and perform the rebooting of the processing unit 100, such as by loading an operating system.

In various embodiments, the initialization logic 108 may detect attributes 112 of each of the plurality of processing cores. One of the attributes 112 may indicate that the core is eligible to be assigned as a BSP or is ineligible to be assigned as the BSP. The attributes 112 may include data associated with the particular processing cores, which may include without limitation, an address of the processing core, a status, an eligibility of the processing core to be the BSP, an indication if the core is the BSP, and other data. The core may read and write information to or from the attributes. The information may be provided in some instances from the packet 110, which may be transmitted between the processing core and the initialization core 106, possibly through other cores or directly from the initialization core.

In one or more embodiments, the initialization logic 108 may detect a last processing core of the plurality of processing cores in the interconnect 102 that is an active processing core based at least in part on a state of a respective processing core and is eligible to be assigned as the BSP based at least in part on one of the attributes 112.

In various embodiments, the packet 110 may include initialization information that is generated from the initialization logic 108 by the initialization core 106. The packet 110 may include an address of a recipient core, such as the core N-M or another core. In some embodiments, the packet may include multiple addresses of different cores, where the cores may have different information to be transmitted to the respective cores or the cores may have the same information to be transmitted to the respective cores. When the packet 110 is received by a core having the address specified by the packet, the core may read at least a portion of the contents of the packet that applies to the core. In some embodiments, a core may read a designation for the core to be the BSP. In response to reading that the core is assigned as the BSP, the core may update an attribute to store a designation as the BSP, such as a designation 114.

In various embodiments, the initialization information, via the packet 110, may assign the last processing core as the BSP. Thus, in a situation where the multi-core processor initiates a booting up process, the BSP may be used to perform some or all of the functions of the booting up process. Thus, the BSP may load or start an operating system.

FIG. 2 is a schematic diagram of an illustrative multi-core processing unit 200 that uses an interconnect arranged as a ring structure 202. The ring structure 202 may accommodate an exchange of the packet 110 between the initialization core and the other cores or between any combinations of the cores.

FIG. 3 is a schematic diagram of an illustrative multi-core processing unit 300 that uses an interconnect arranged as a mesh 302. The mesh 302 may accommodate an exchange of the packet 110 between the initialization core and the other cores or between any combinations of the cores.

FIG. 4 is a schematic diagram of an illustrative multi-core processing unit 400 that uses an interconnect arranged in a peer-to-peer configuration 402. The peer-to-peer configuration 402 may accommodate an exchange of the packet 110 between the initialization core and the other cores or between any combinations of the cores.

Illustrative Operation

Figure 5:
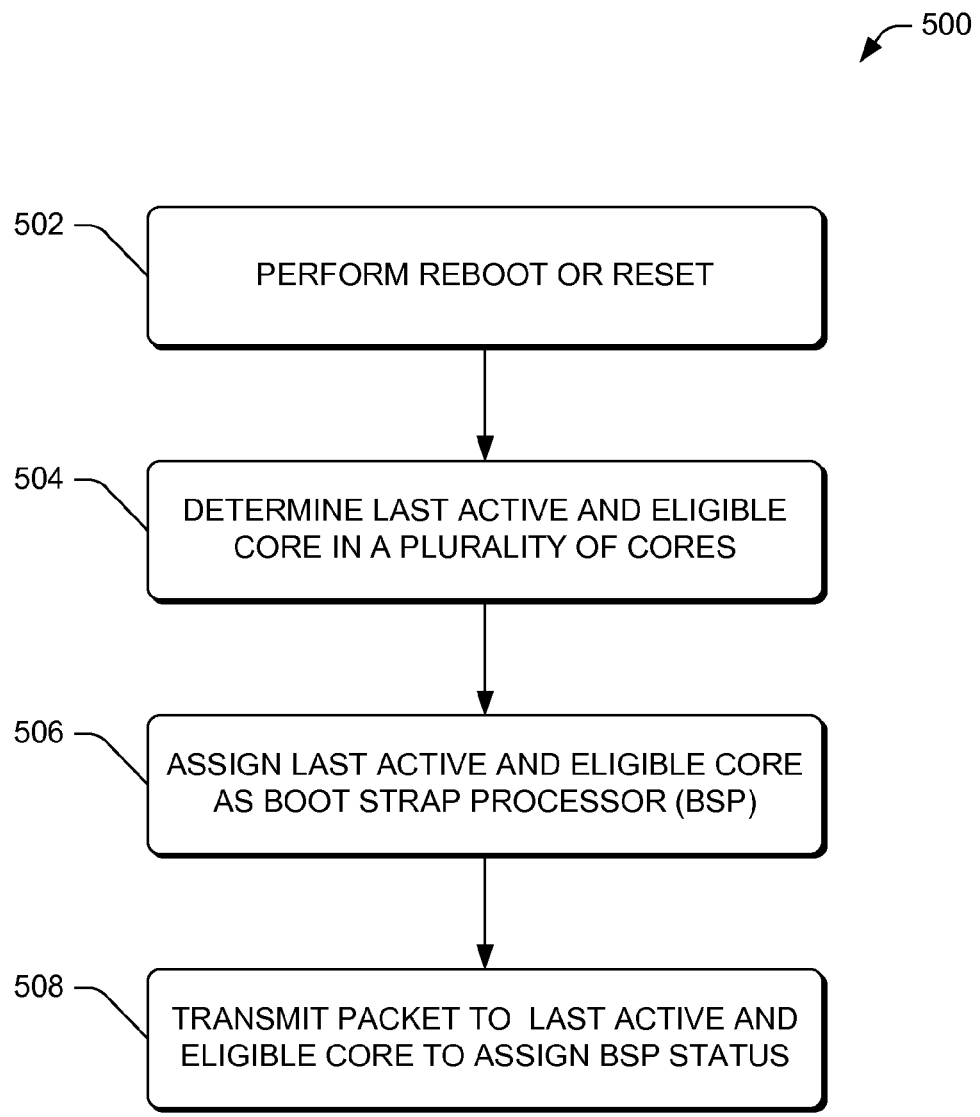
FIG. 5 is a flow diagram of an illustrative process to assign a boot strap processor designation to a last available core.
Figure 6:
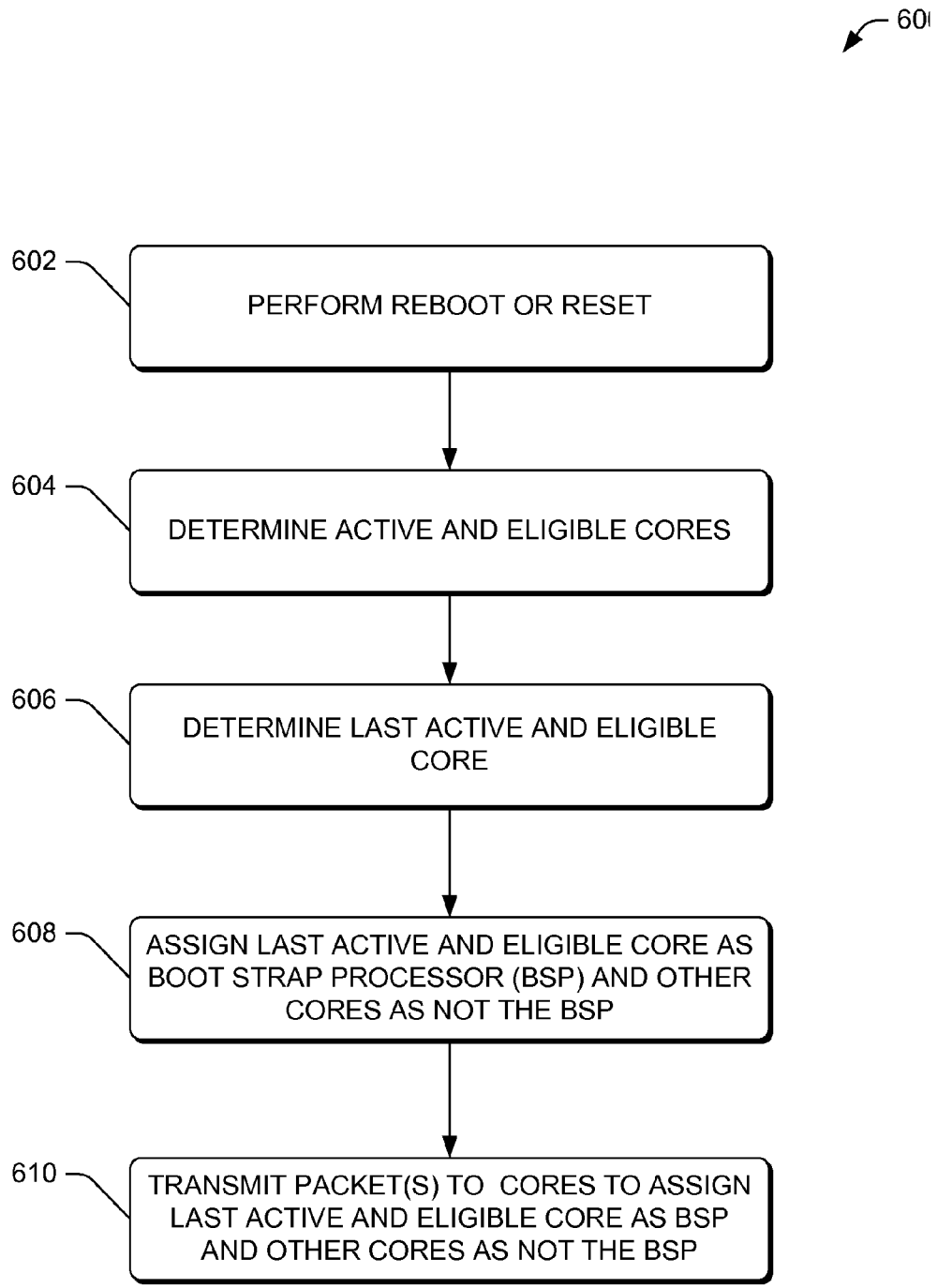
FIG. 6 is a flow diagram of another illustrative process to assign a boot strap processor designation to a last available core.

FIGS. 5 and 6 show illustrative processes to perform assignment of the BSP to a last available core in a processor. The processes are illustrated as a collection of blocks in a logical flow graph, which represent a sequence of operations that can be implemented in hardware, software, or a combination thereof. The order in which the operations are described is not intended to be construed as a limitation, and any number of the described blocks can be combined in any order and/or in parallel to implement the processes. The processes are described with reference to the environment 100. Of course, the processes may be performed in other similar and/or different environments.

FIG. 5 is a flow diagram of an illustrative process 500 to assign a BSP designation to a last available core.

At 502, the processing unit 100 may perform a reboot or a reset. The reboot or the reset may, in some instances, follow deactivation of one or more of a plurality of processing cores. The cores may be deactivated by a system administrator, by a user, or by instructions executed by the processing unit 100.

At 504, the initialization logic may detect the last active and eligible core of the plurality of processing cores. The initialization logic may exchange or attempt to exchange a packet with the plurality of processing cores to determine a state of the cores as active or inactive and as eligible to be a BSP or ineligible to be the BSP. For example, the initialization logic may determine that cores that are unresponsive to a request included in the packet are inactive cores. Some cores may be designated as ineligible to be the BSP because of limited capacity, functionality, or other characteristics of these cores. The attributes of these cores may include an indication that these cores are ineligible to be the BSP. In some embodiments, the initialization logic may store an indication of cores that are eligible to be the BSP and/or an indication of cores that are ineligible to be the BSP.

Thus, at 504, the initialization logic may detect which active cores are also eligible to be the BSP. In addition, at 504, the initialization logic may detect which of these active and eligible cores is a last core. The last core may be detected based on a location of the core with respect to the interconnect. For example, when the interconnect is arranged as a ring structure, then the last core may be detected by a position within the ring structure. Besides a position of the cores in the interconnect, the last core may be detected based on one or more of a time to respond to a request from the initiation processor, a distance from the initiation processor, and/or other characteristics of the cores.

At 506, the initialization core may assign the last active and eligible core as the BSP. The initialization core may perform the assignment via the initiation logic by including the assignment in the initialization information in a packet.

At 508, the initialization core may transmit the packet to at least some of the cores, such as the core designated as the last active and eligible core. Upon receipt of the packet, the last active and eligible core may read a message, which may cause the core to read or write data, or otherwise execute an instruction. The core may perform a write action to designate the core as the BSP.

FIG. 6 is a flow diagram of another illustrative process 600 to assign the BSP designation to a last available core.

At 602, the processing unit 100 may perform a reboot or a reset. The reboot or the reset may, in some instance, follow deactivation of one or more of a plurality of processing cores.

At 604, the initialization logic may detect active and eligible core of the plurality of processing cores. As discussed above, the initialization logic may exchange or attempt to exchange a packet with the plurality of processing cores to determine a state of the cores as active or inactive and as eligible to be a BSP or ineligible to be the BSP. The attributes of these cores may include an indication that these cores are ineligible to be the BSP. In some embodiments, the initialization logic may store an indication of cores that are eligible to be the BSP and/or an indication of cores that are ineligible to be the BSP.

At 606, the initialization logic may detect which of these active and eligible cores is a last core. The last core may be detected based on a location of the core with respect to the interconnect, such as a location of the cores in a ring structure. Besides a position of the cores in the interconnect, the last core may be detected based on one or more of a time to respond to a request from the initiation processor, a distance from the initiation processor, and/or other characteristics of the cores.

At 608, the initialization core may assign the last active and eligible core as the BSP. The initialization core may perform the assignment via the initiation logic including initialization information into a packet. The initialization core may also assign the other cores as not the BSP. For example, when each core includes an attribute that indicates whether the core is the BSP, then the initialization core may create an assignment for each of the cores as either the BSP or not the BSP.

At 610, the initialization core may transmit the packet to the cores. Upon receipt of the packet, the last active and eligible core may read a message, which may cause the core to read or write data, or otherwise execute an instruction. The core may perform a write action to designate the core as the BSP. Cores that are not the last active and eligible core, but that are active, may receive a packet (possibly the same packet), that indicate that those cores are not the BSP.

Figure 7:
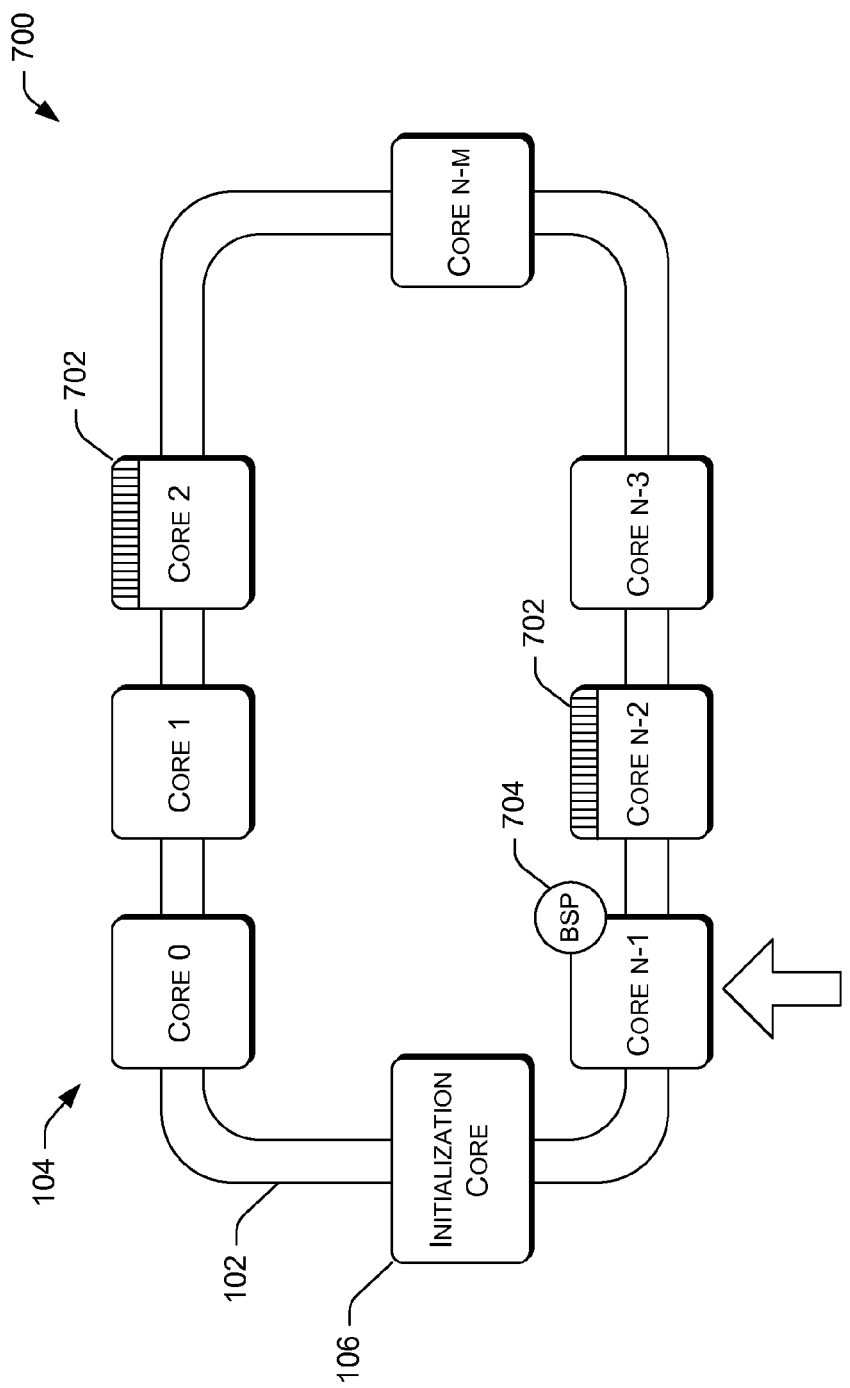
FIG. 7 is a schematic diagram of a multi-core processing unit that assigns a boot strap processor to a last available core.

FIG. 7 is a schematic diagram of a multi-core processing unit 700 that assigns a boot strap processor to a last available core. The multi-core processing unit 700 includes the initialization core 106 and the plurality of cores 106 in communication using the interconnect 102. Some cores 702 (one or more) of the plurality of the cores may be designated as ineligible to be the BSP, which is indicated in FIG. 7 by crosshatching. These cores may be designated as ineligible to be the BSP because of limited capacity, functionality, or other characteristics of these cores.

When the process 500 or the process 600 is applied to the multi-core processing unit 700 via the initialization logic, the processes may determine that the cores 0, 1, N–M, N–3, and N–1 are all active cores and also eligible to be assigned as the BSP. The processes may select the last core 704 as the BSP due to the last core's location in the interconnect 102 or for other reasons as discussed above.

Figure 8:
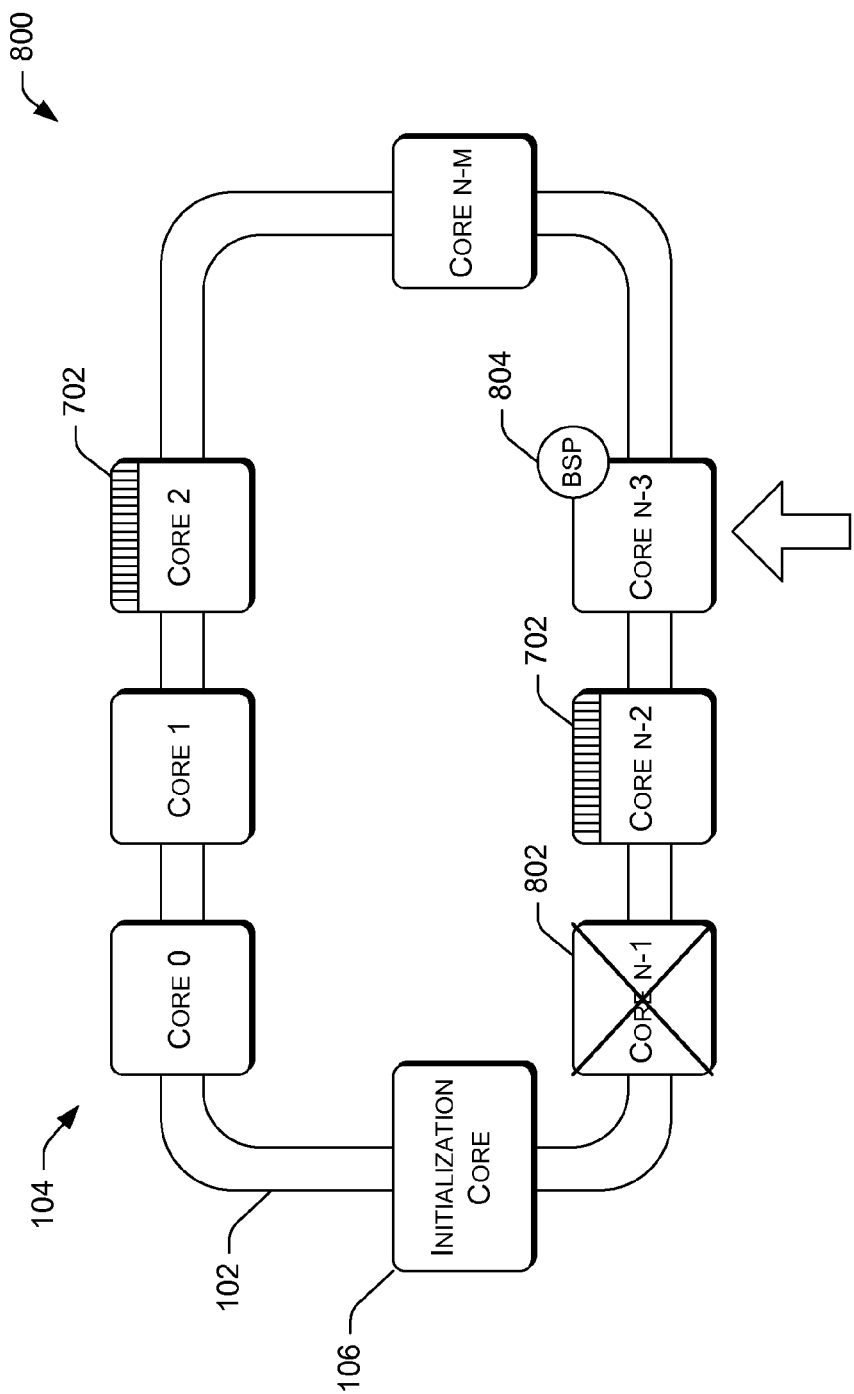
FIG. 8 is a schematic diagram of a multi-core processing unit that includes inactive cores and that assigns a boot strap processor to a last available core.

FIG. 8 is a schematic diagram of a multi-core processing unit 800 that includes inactive cores and that assigns a boot strap processor to a last available core. In the multi-core processing unit 800, core n–1 is shown as being an inactive core 802. Core n–1 may have been deactivated by an administrator, a user, or by instructions executed by the multi-core processing unit 800. Some cores 702 (one or more) of the plurality of the cores may be designated as ineligible to be the BSP, which is indicated in FIG. 8 by crosshatching. These cores may be designated as ineligible to be the BSP because of limited capacity, functionality, or other characteristics of these cores.

When the process 500 or the process 600 is applied to the multi-core processing unit 800 via the initialization logic, the processes may determine that the cores 0, 1, N–M, and N–3 are all active cores and also eligible to be assigned as the BSP. The processes may select the last core 804 as the BSP due to the last core's location in the interconnect 102 or for other reasons as discussed above.

Illustrative System

Figure 9:
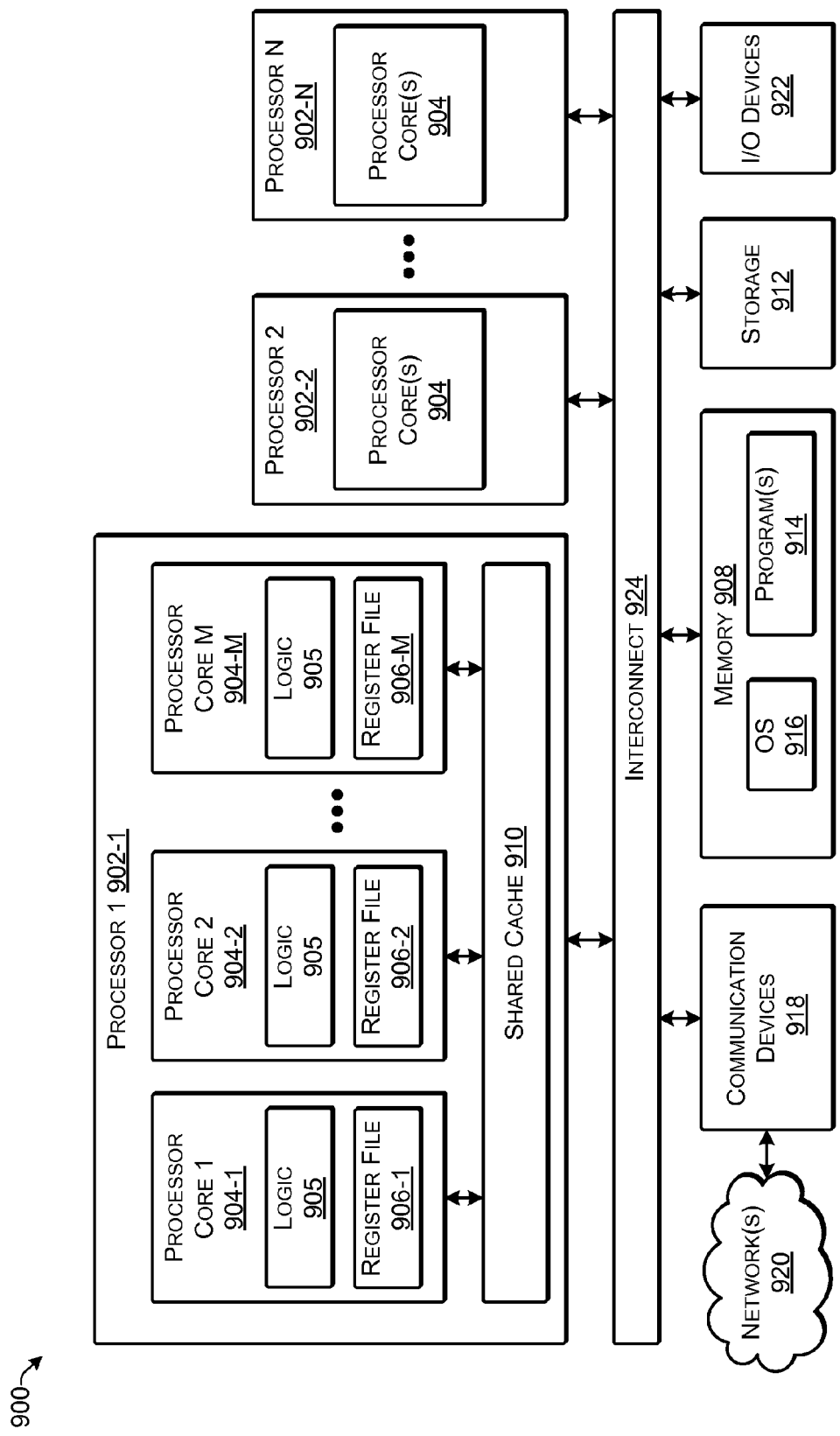
FIG. 9 is a block diagram of an illustrative system to perform assignment of a boot strap processor to a last available core in a processor.

FIG. 9 illustrates nonlimiting select components of an illustrative system 900 according to some implementations herein that may include one or more instances of the processor architecture discussed above for implementing assignment of a boot strap processor to a last available core in a processor. The system 900 may include one or more processors 902-1, 902-2, . . . , 902-N (where N is a positive integer ≥1), each of which may include one or more processor cores 904-1, 904-2, . . . , 904-M (where M is a positive integer ≥1). In some implementations, as discussed above, the processor(s) 902 may be a single core processor, while in other implementations, the processor(s) 902 may have a large number of processor cores, each of which may include some or all of the components illustrated in FIG. 9. For example, each processor core 904-1, 904-2, . . . , 904-M may include an instance of logic 905 to perform various tasks for that respective processor core 904-1, 904-2, . . . , 904-M. The logic 905 may include one or more of dedicated circuits, logic units, microcode, or the like.

The processor(s) 902 and processor core(s) 904 can be operated to fetch and execute computer-readable instructions stored in a memory 908 or other computer-readable media. The memory 908 may include volatile and nonvolatile memory and/or removable and non-removable media implemented in any type of technology for storage of information, such as computer-readable instructions, data structures, program modules or other data. Such memory may include, but is not limited to, RAM, ROM, EEPROM, flash memory or other memory technology. In the case in which there are multiple processor cores 904, in some implementations, the multiple processor cores 904 may share a shared cache 910. Additionally, storage 912 may be provided for storing data, code, programs, logs, and the like. The storage 912 may include solid state storage, magnetic disk storage, RAID storage systems, storage arrays, network attached storage, storage area networks, cloud storage, CD-ROM, digital versatile disks (DVD) or other optical storage, magnetic cassettes, magnetic tape, or any other medium which can be used to store desired information and which can be accessed by a computing device. Depending on the configuration of the system 900, the memory 908 and/or the storage 912 may be a type of computer readable storage media and may be a non-transitory media.

The memory 908 may store functional components that are executable by the processor(s) 902. In some implementations, these functional components comprise instructions or programs 914 that are executable by the processor(s) 902. The example functional components illustrated in FIG. 9 further include an operating system (OS) 916 to mange operation of the system 900.

The system 900 may include one or more communication devices 918 that may include one or more interfaces and hardware components for enabling communication with various other devices over a communication link, such as one or more networks 920. For example, communication devices 918 may facilitate communication through one or more of the Internet, cable networks, cellular networks, wireless networks (e.g., Wi-Fi, cellular) and wired networks. Components used for communication can depend at least in part upon the type of network and/or environment selected. Protocols and components for communicating via such networks are well known and will not be discussed herein in detail.

The system 900 may further be equipped with various input/output (I/O) devices 922. Such I/O devices 922 may include a display, various user interface controls (e.g., buttons, joystick, keyboard, touch screen, etc.), audio speakers, connection ports and so forth. An interconnect 924, which may include a system bus, point-to-point interfaces, a chipset, or other suitable connections and components, may be provided to enable communication between the processors 902, the memory 908, the storage 912, the communication devices 918, and the I/O devices 922.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A processor comprising:
a plurality of processing cores;
a ring interconnect coupled to the plurality of processing cores; and
a first logic, in one of the plurality of processing cores, to assign a processing core of the plurality of processing cores as a boot strap processor (BSP), wherein the assignment is to be formatted into a packet and transmitted on the ring interconnect and the BSP is a positionally last processing core of the plurality of processing cores on the ring interconnect that is active and detected by the first logic.

2. The processor as recited in claim 1, further comprising:
a second logic to detect a state of each of the plurality of processing cores as active or inactive;
a third logic to detect an attribute of each of the plurality of processing cores as eligible to be assigned as the BSP or as ineligible to be assigned as the BSP; and
a fourth logic to detect the processing core that is active based at least in part on the state and is eligible to be assigned as the BSP based at least in part on the attribute.

3. The processor as recited in claim 1, wherein the ring interconnect includes a plurality of connections that enable transmission of packets of data to and from each of the plurality of processing cores.

4. The processor as recited in claim 1, wherein the BSP to perform a booting operation after a restart or reset of the processor.

5. A processor comprising:
a plurality of processing cores;
a ring interconnect coupled to the plurality of processing cores; and
an initialization logic to assign a boot strap processor (BSP) to an active and eligible processing core of the plurality of processing cores by a transmission using the ring interconnect, wherein the initialization logic to assign the BSP as a positionally last processor core that is active and eligible with respect to the plurality of processing cores in connection with the initialization logic through the ring interconnect.

6. The processor as recited in claim 5, wherein the initialization logic further to:
detect a state of each of the plurality of processing cores as active or inactive; and
detect an attribute of each of the plurality of processing cores as eligible to be assigned as the BSP or as ineligible to be assigned as the BSP.

7. The processor as recited in claim 5, wherein the initialization logic assigns the BSP following a reset or reboot of the processor.

8. The processor as recited in claim 5, wherein the BSP to load an operating system for execution by the processor.

9. The processor as recited in claim 5, wherein the processor further comprises a socket to connect the processor with a corresponding socket on an electronic device.

10. A method, comprising:
detecting a positionally last active and eligible processing core from a plurality of processing cores on a ring interconnect; and
assigning, using a packet transmitted on the ring interconnect, the last active and eligible processing core as a boot strap processor (BSP) for the plurality of processing cores.

11. The method as recited in claim 10, further comprising transmitting the packet to the positionally last active and eligible processing core, the positionally last active and eligible processing core reading the packet and then modifying an indicator to indicate the assignment of the last active and eligible processing core as the BSP.

12. The method as recited in claim 10, wherein the assigning is communicated to the positionally last active and eligible processing core by the packet transmitted on the interconnect that is arranged as a ring structure.

13. The method as recited in claim 10, wherein the detecting includes detecting a state of each of the plurality of processing cores as active or inactive.

14. The method as recited in claim 10, wherein the detecting includes detecting an attribute of each of the plurality of processing cores as eligible to be assigned as the BSP or as ineligible to be assigned as the BSP.

15. The method as recited in claim 10, further comprising performing a reboot or a reset of a system that includes the plurality of processing cores prior to the detecting of the last active and eligible processing core.

* * * * *